US005675632A

United States Patent [19]
Odaka et al.

[11] Patent Number: 5,675,632
[45] Date of Patent: Oct. 7, 1997

[54] TELEPHONE EXCHANGE NETWORK USING TELEPHONE EXCHANGES WITH SPEECH RECOGNITION

[75] Inventors: Toshiyuki Odaka; Akio Amano, both of Tokyo; Nobuo Hataoka, Kanagawa; Tetsuo Takemura, Yokohama; Toshiaki Suzuki, Yokohama; Ryujiro Muramatsu, Yokohama, all of Japan

[73] Assignee: Hitachi, Ltd., Tokyo, Japan

[21] Appl. No.: 512,406

[22] Filed: Aug. 8, 1995

[30] Foreign Application Priority Data

Aug. 11, 1994 [JP] Japan ................................. 6-189245

[51] Int. Cl.$^6$ ................................................ H04M 1/64
[52] U.S. Cl. ........................ 379/67; 379/197; 379/201; 379/282
[58] Field of Search ..................... 379/67, 88, 89, 379/197, 201, 282, 196, 280

[56] References Cited

U.S. PATENT DOCUMENTS

| | | | |
|---|---|---|---|
| 4,763,350 | 8/1988 | Immendorfer et al. | 379/67 |
| 5,099,509 | 3/1992 | Morganstein et al. | 379/84 |
| 5,166,971 | 11/1992 | Vollert | 379/88 |
| 5,452,340 | 9/1995 | Engelbeck et al. | 379/88 |

OTHER PUBLICATIONS

Shikiba, "Basics of Electronic Switching System", Denki Tsushin Kyokai (1972), table of contents and p. 396. (No Translation).

Aizawa et al, "Digital Exchange Made Easy", Denki Tsushin Kyokai (1994), table of contents, pp. 1–7 and 50–55. (No Translation).

Nakagawa, "Development of Chronological Pattern Referencing Algorithm in Voice Recognition", Artificial Intelligence Association, vol. 3, No. 4, 1988, pp. 414–422 (No Translation).

*Primary Examiner*—Fan Tsang
*Attorney, Agent, or Firm*—Fay, Sharpe, Beall, Fagan, Minnich & McKee

[57] ABSTRACT

A telephone exchange enables subscribers to use voice dialing more easily with existing telephone systems. The voice dialing does not require special input operations or preregistration of called parties. Rather, a subscriber can make a telephone call easily without having to perform multiple operations. The telephone exchange includes structure for discriminating dial pulse information, push-button tone information, and spoken information so that one or more of these types of information can be input by a caller to achieve connection to the called party.

5 Claims, 7 Drawing Sheets

FIG. 5(a)

| 11 | 12 |
|---|---|
| XX CORPORATION | 23-XXX |
| XX WARD OFFICE | 23-XXX |
| ⋮ | ⋮ |
| MR. SATO | 23-XXX |
| MR. SUZUKI | 23-XXX |
| ⋮ | ⋮ |

FIG. 5(b)

| 11 | 12 |
|---|---|
| KOKUBUNJI | 0423 |
| 23 WARDS OF TOKYO | 03 |
| ⋮ | ⋮ | ns
TELEPHONE EXCHANGE NETWORK USING TELEPHONE EXCHANGES WITH SPEECH RECOGNITION

BACKGROUND OF THE INVENTION

1. Field of the Invention

The present invention relates generally to telephone exchange networks, and more particularly to a telephone exchange network that employs circuitry for recognizing dial pulse signals, push button tone signals, and speech signals in a telephone exchange installed in a telephone office or PBX on premises.

2. Description of the Related Art

When a person makes a telephone call, the person often cannot remember the telephone number needed to make the call. Although it is possible to consult an address book, telephone directory, or directory assistance operator, "dialing" by recognition of voiced information is desirable.

Currently, there are two methods for realizing voice dialing. The first method is to add a speech recognition function to a telephone terminal. According to this method, the caller speaks the name of the person to be called, and a speech recognition unit in the source telephone recognizes the callee's name and translates the name into a telephone number. Then, the speech recognition unit outputs a dial pulse or a push-button tone signal corresponding to the telephone number onto the telephone line. According to the second method, speech recognition equipment is connected to the telephone line downstream from the source telephone. According to this method, the caller must first initiate a phone call to the location containing the speech recognition equipment. After thus establishing a speech path, the caller can speak the callee's name. The speech recognition equipment then recognizes the name and translates it into a dial number, after which a speech path is created between the two parties. According to both methods, the callee's name and telephone number must be pre-registered for the speech recognition conversion to telephone number to be possible.

Accordingly, there is a need to provide a telephone exchange that has a voice dialing function because the conventional telephone exchange can deal only with a dial pulse signal or a push-button tone signal to initiate the speech path between the calling and called parties. Thus, as stated above, the caller must either remember the telephone number of the callee, or access a directory source for the telephone number information.

SUMMARY OF THE INVENTION

The present invention adds a voice dialing function to the telephone exchange so that the caller can initiate a speech path simply by speaking certain information into the source telephone handset. In other words, a call can be initiated simply by picking up and speaking into the raised handset, whereby the telephone exchange is accessed without having to dial a number. In a preferred embodiment, any or all of the following input signals can be recognized to generate a telephone call: speech signals, dial pulse signals, and push-button tone signals. Thus, according to the invention, special pre-registration of name and number information is rendered unnecessary, as is the equipment required to store such pre-registered information.

BRIEF DESCRIPTION OF THE DRAWINGS

FIGS. 5(a) and 5(b) show an example of telephone directory information;

DETAILED DESCRIPTION OF THE PREFERRED EMBODIMENTS

Figure 1:
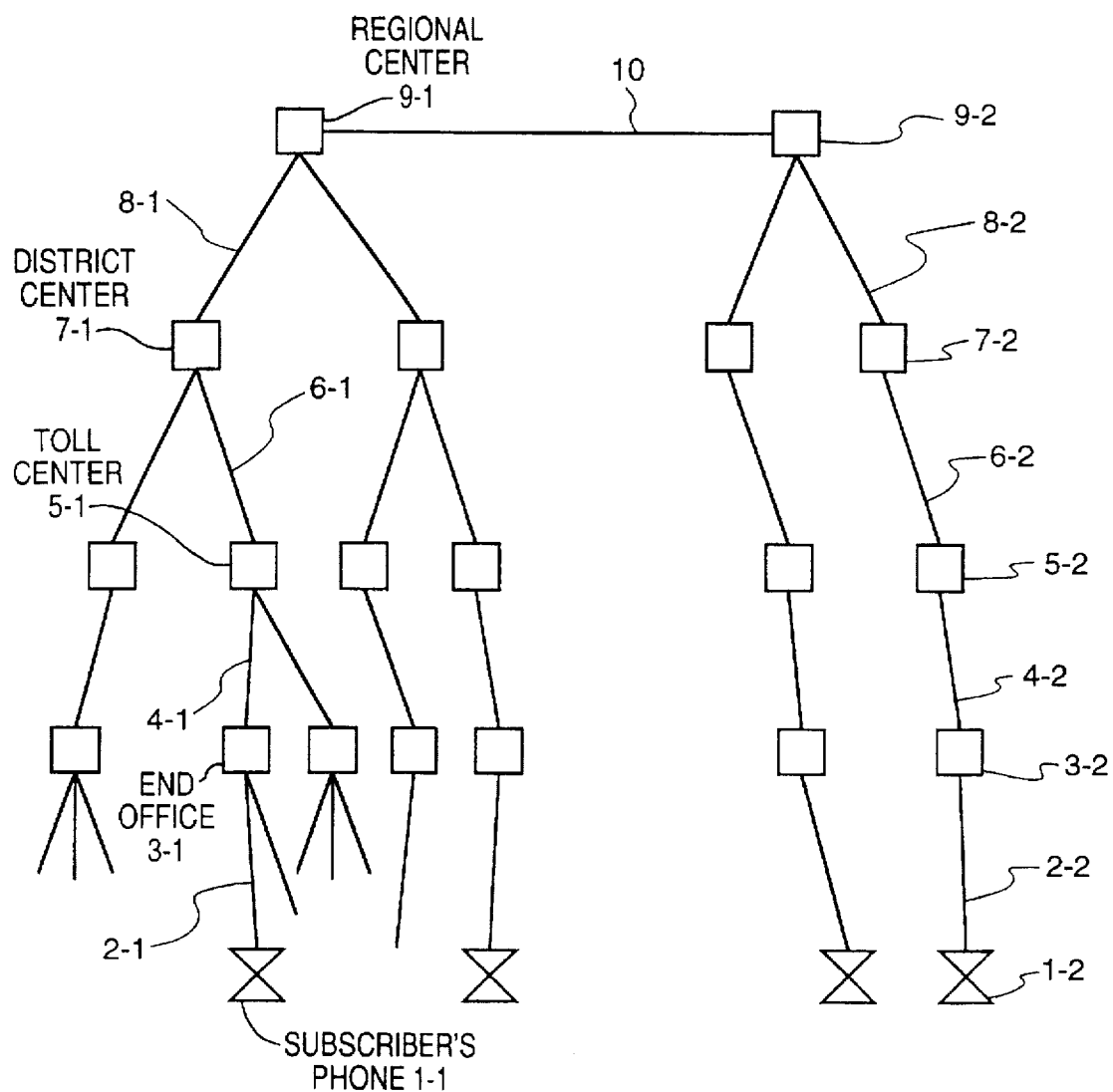
FIG. 1 is a block diagram of a telephone exchange network.

FIG. 1 is a block diagram illustrating a hierarchically structured telephone exchange network. Each subscriber telephone 1-1 is connected through a subscriber loop 2-1 to an exchange 3-1 in an end office. Each exchange 3-1 is connected to an exchange 5-1 in a higher-level toll center through a trunk 4-1 or to telephones belonging to other subscribers. Each exchange 5-1 in the toll center is in turn connected to an exchange 7-1 in a district center at a still higher level through a trunk 6-1 or to exchanges of other toll centers. Each exchange 7-1 in the district center is connected to an exchange 9-1 in a higher-level regional center through a trunk 8-1 or to exchanges in other district centers. The exchange 9-1 in the regional center is connected to an exchange 9-2 in another regional center through a trunk 10 or to exchanges of other district centers.

By way of example, when a subscriber makes a telephone call from his telephone 1-1 to the telephone 1-2 of another subscriber, the telephone connection is made through the subscriber loop 2-1, exchange 3-1 in the end office, trunk 4-1, exchange 5-1 in the toll center, trunk 6-1, exchange 7-1 in the district center, trunk 8-1, exchange 9-1 in the regional center, trunk 10, exchange 9-2 in the regional center, trunk 8-2, exchange 7-2 in the district center, trunk 6-2, exchange 5-2 in the toll center, trunk 4-2, exchange 3-2 in the end office, and subscriber loop 2-2. In the conventional telephone exchange network, the connection from one subscriber telephone 1-1 to another subscriber telephone 1-2 is accomplished using a DP (dial pulse) or PB (push-button tone) reception circuit in the exchange installed in each switching office. A reception circuit recognizes the number input by the caller, which number is transferred in the form of dial pulses or push-button tone signals. Call route connection control is performed according to the number.

According to the present invention, however, the telephone exchange network has, at each exchange, a speech recognition function for recognizing speech signals entered through the subscriber loops or trunks, such as by the caller at his telephone 1-1. Additionally, each exchange has the DP and PB reception circuits, so that the call route connection control can be performed based on a telephone number derived from speech signals as well as dial pulses or push-button tone signals.

Preferably, the system is arranged so that the speech signal can be recognized in parallel with the recognition of push-button tone signals, or even dial pulse signals. This arrangement enables dialing using any of speech signals, push-button tone signals, or dial pulse signals, or a combination of any of these. For example, a caller can press "03" to send a corresponding push-button tone signal, and then speak "Chiyoda ward office in Chiyoda-ku" which connects the caller's subscriber telephone to the Chiyoda ward office in Tokyo (code "03"). A more detailed configuration of the exchange, including circuits that realize these functions, will be described below.

Figure 2:
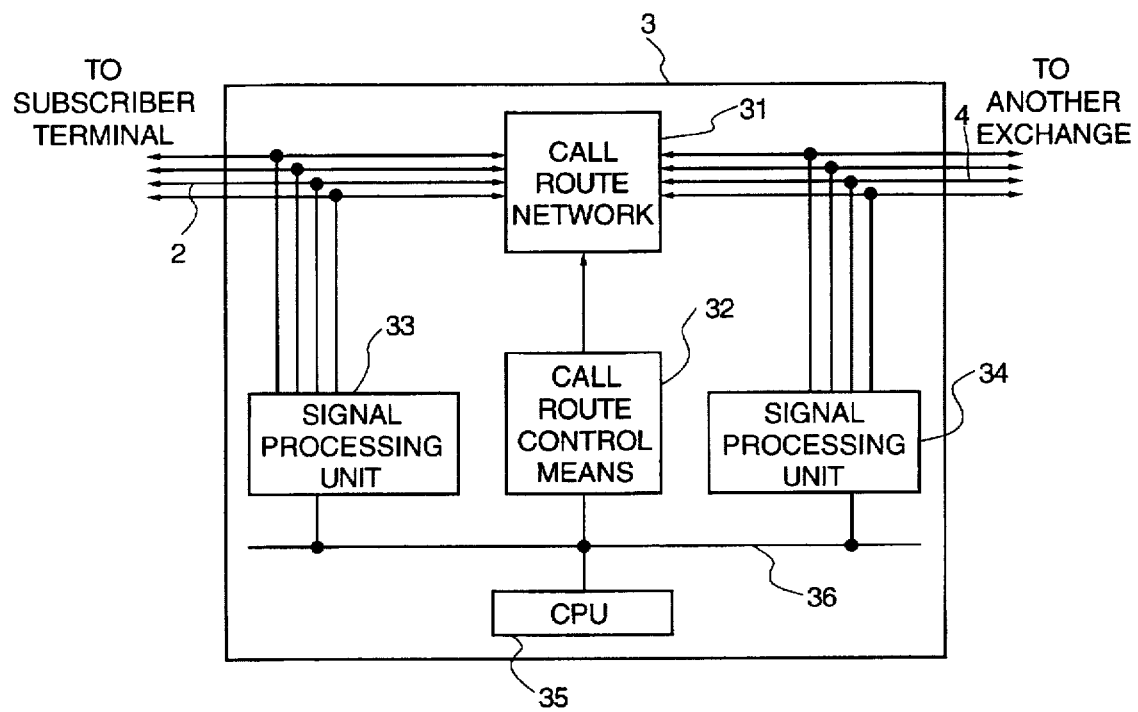
FIG. 2 is a block diagram of a telephone exchange.

Turning to FIG. 2, the telephone exchange network installed according to the hierarchy shown in FIG. 1 includes a plurality of telephone exchanges, the function of one of which will be described. The fundamental function of the exemplary telephone exchange is the same for all of the telephone exchanges.

As shown in FIG. 2, each of the telephone exchanges 3 is connected to a subscriber loop 2 and a trunk 4. The exchange 3 comprises a call route network 31, a call route control means 32, a signal processing unit 33 for the subscriber loop 2, a signal processing unit 34 for the trunk 4, and a central processing unit 35. Where the structure or function of any of these elements is not described with particularity, the conventional technology is assumed.

The call route network 31 is a switch network for connecting together subscriber loops 2, or for connecting a subscriber loop 2 to a trunk 4. The call route network 31 is controlled by the call route control means 32 to establish a connection between particular subscriber loops 2 or between a particular subscriber loop 2 and a trunk 4. The call route control means 32 is connected through an internal bus in the exchange to the central processing unit 35, which manages the call route control operation.

The signal processing units 33, 34 each process signals sent from the subscriber loop 2 and the trunk 4. For example, the dial signal fed from the subscriber loop 2 is discriminated and converted by the signal processing unit 33 into a telephone number signal. Based on the converted number, a called subscriber loop 2 (a destination for the call) or trunk 4 is determined and used for the call route connection control. In addition to the dial signal discrimination, the signal processing unit 33 also sends a ring-back tone while ringing to the subscriber loop 2 and, when the called party is busy, sends an "in-use" tone to the caller's subscriber loop 2. A detailed configuration of the telephone exchange is described in Shikiba, "Basics of Electronic Switching System", *Denki Tsushin Kyokai* (1972), or Aizawa et al, "Digital Exchange Made Easy", *Denki Tsushin Kyokai* (1994).

The foregoing is a general description common to conventional telephone exchanges. The telephone exchange of this invention is characterized by a speech recognition device incorporated in the signal processing units 33, 34, in parallel with the conventional DP reception circuit and/or the conventional PB reception circuit. The invention thus allows the use of speech signals as an input to be converted into a telephone number signal, whereas the conventional telephone exchange permits only the dial pulse or push-button tone signal as an input.

Figure 3:
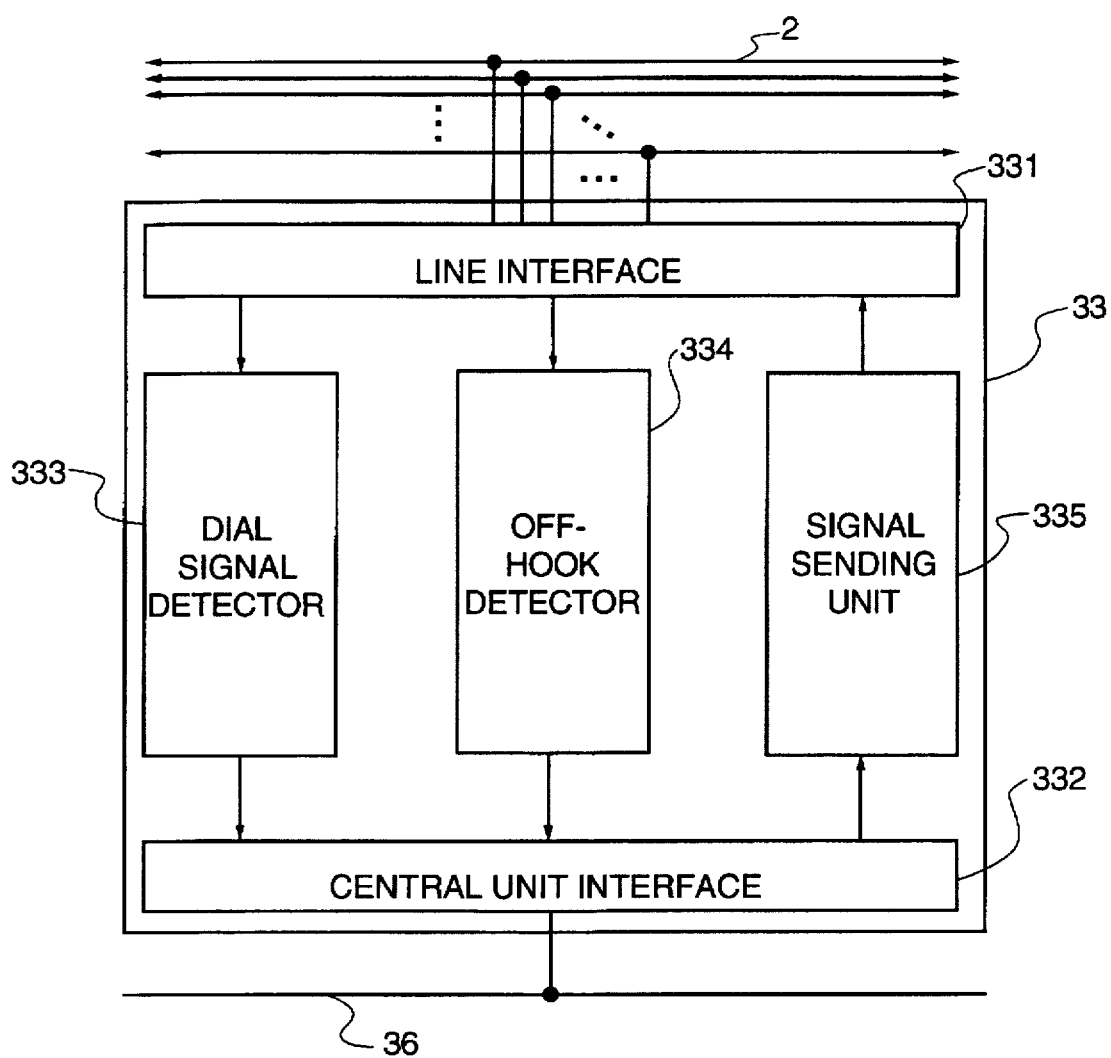
FIG. 3 is a block diagram of a signal processing unit.

FIG. 3 is a block diagram of the signal processing unit 33 or 34 constructed according to the invention. The signal processing unit 33 includes a line interface 331, a central processing unit 332, a dial signal detector 333, an off-hook signal detector 334, and a signal sending unit 335.

When a caller picks up the handset, an off-hook signal (electric current) is sent through subscriber line 2 and line interface 331 to the off-hook detector 334. The off-hook detector 334 detects the off-hook status of the hand-set, and reports this condition to the central processing unit 35 through central unit interface 332 and internal bus 36. In reply to this report, the central processing unit 35 sends a control command to this signal sending unit 335 so that the signal sending unit 335 sends out a dial tone to the subscriber through line interface 331 and subscriber line 2.

Upon hearing the dial tone, the subscriber sends a dial signal using a push-button or rotary dial, or simply by speaking certain information such as the name of the person whom the subscriber wants to call. The dial signal is input through subscriber line 2 and line interface 331 to dial signal detector 333. The dial signal detector 333 is capable of receiving a dial pulse signal, a push-button tone signal, and speech signal (spoken information). If the dial signal is a dial pulse or push-button tone signal, the dial signal detector 333 translates the dial signal into a telephone number signal and sends the telephone number signal to the central processing unit 35. If the dial signal is a speech signal, the dial signal detector 333 recognizes the speech, and translates it into a telephone number signal. The telephone number signal is then sent to the central processing unit 35.

Figure 4:
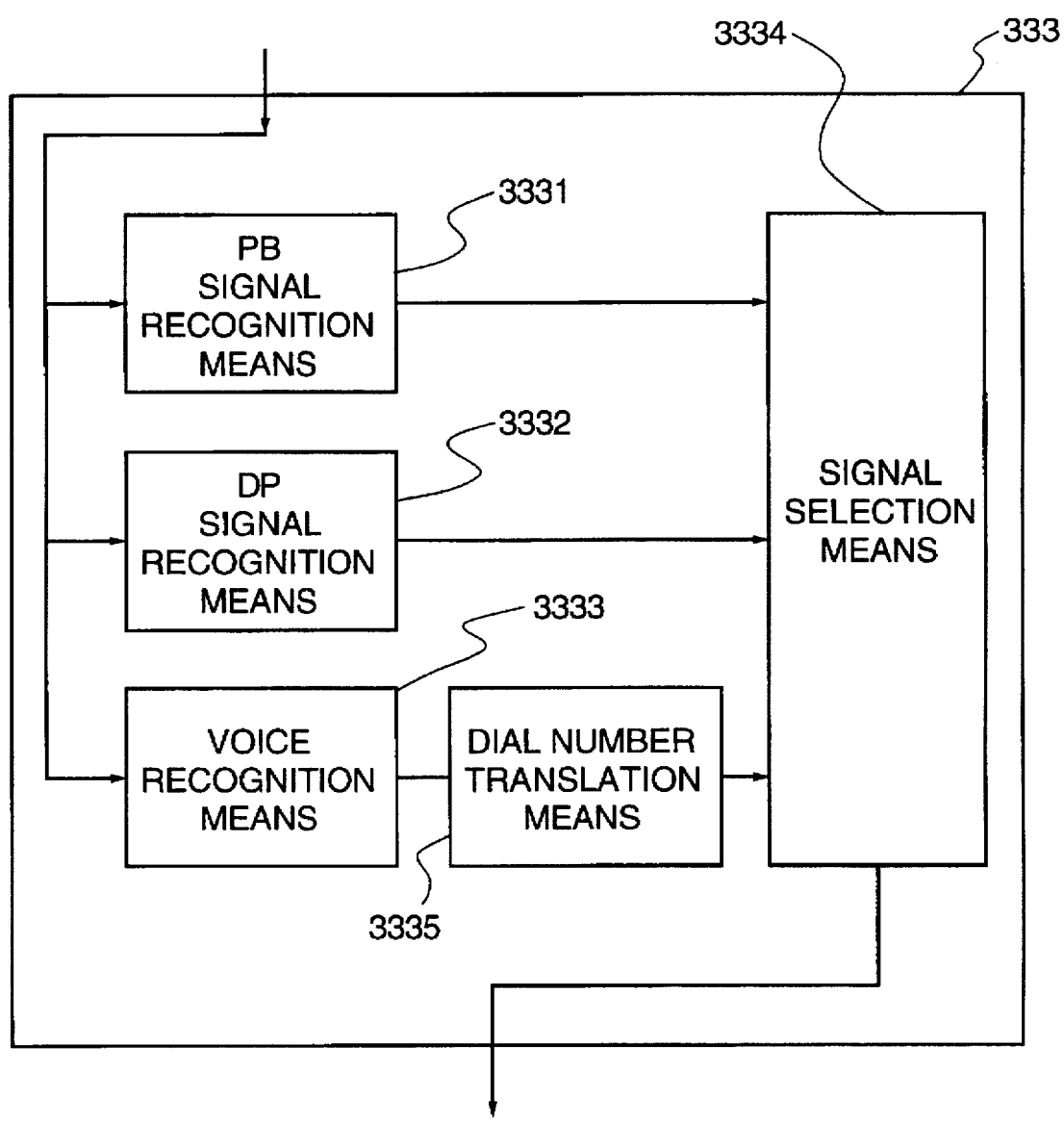
FIG. 4 is a block diagram of a signal detection means.

FIG. 4 shows a block diagram of the dial signal detector 333. The dial signal detector 333 includes a push-button signal detector 3331, a dial pulse detector 3332, a speech recognition means 3333, a dial number translation means 3335, and a signal selection means 3334. The push-button signal detector 3331, dial pulse detector 3332, and speech recognition means 3333 are all connected to the subscriber line 2 through the line interface 3331. These three devices receive the dial signal from the subscriber line 2 at the same time. If the dial signal is a push-button tone signal, only the push-button signal detector 3331 can correctly interpret the input signal. If the dial signal is a dial pulse signal, only the dial pulse detector 3332 can recognize and correctly interpret the input signal. Similarly, the if the dial signal is a speech signal, only the speech recognition means 3333 can correctly interpret the input signal. In each instance, the two detectors that do not recognize and interpret the input signal provide information indicating the failure to interpret the input signal to the signal selection means 3334. The enabled detector supplies the interpreted dial signal to the signal selection means 3334 (via the speech-number signal translation means 3335 in the case of the speech recognition means 3333). The signal selection means 3334 understands the nature of the dial signal from the inputs of the various detectors, and sends the telephone number signal to the central processing unit 35 through the central processing unit interface 332 and internal bus 36.

In the case of the speech recognition, spoken numbers, called subscriber names, regional names, and service names, for example, may be identified and interpreted by the speech recognition means 3333. The speech recognition means 3333 converts the input speech signal into text or number information. There are many ways to implement the speech recognition means 3333, to none of which the present invention is limited. For example, by using the HMM (hidden Markov model) method, information on a lexicon of a subject can be prepared as text data by presenting pronunciation codes to make the prepared lexicon recognizable. See Nakagawa, "Development of Chronological Pattern Referencing Algorithm in Voice Recognition", *Artificial Intelligence Association*, Vol. 3, No. 4, (1988) pp. 414–423.

When the information to be identified is a spoken number, because a combination of numbers representing a telephone number is finite and fixed, a series of pronunciation codes should be prepared that represents a combination of these numbers as a lexicon to be recognized. When the information to be identified is not a number, text data representing a series of pronunciation codes of the vocabulary to be identified should be provided. This information is provided by the speech-number signal translation means 3335. The speech recognition means 3333 establishes the vocabulary to be recognized within the range of telephone directory information held by the speech-number signal translation means 3335. With the result of recognition performed by the speech recognition means 3333 taken as its input, the speech-number signal translation means 3335 searches for the matching (corresponding) telephone number and sends a signal corresponding to the telephone number to the central processing unit 35.

FIGS. 5(a) and 5(b) show an example of a telephone directory stored in the speech-number signal translation means 3335. The telephone directory information need only contain a part of the contents of an existing telephone directory. In the case of a telephone exchange in the switching office of Kokubunji City, the telephone directory information includes at least the names of organizations ("XX Corporation" or "XX Ward Office" for example) and names of subscribers ("Sato" or "Suzuki", for example), as exemplified by the first column 11 of FIG. 5(a), and the telephone numbers, as exemplified by the second column 12.

As shown in FIG. 5(b), the "Kokubunji Switching Office" is identified by the prefix information "0423", and the identified one of the "23 wards of Tokyo" is indicated by the information "03". Information in the first column 11 is converted into a series of pronunciation codes for the vocabulary to be recognized by the speech recognition means 3333 and transferred to the speech recognition means 3333. Based on the result of recognition processing performed by the speech recognition means 3333, the telephone number shown in the second column 12 is sent to the central processing unit 35.

In another example of telephone directory information held by the speech-number signal translation means 3335, information concerning toll-free calling may be included. By putting combinations of toll-free entities and their telephone numbers in the speech-number signal translating means 3335 of an exchange, the system enables the exchange to handle toll-free calls.

Next, the process of voice dialing using the inventive telephone exchange will be explained.

Figure 6:
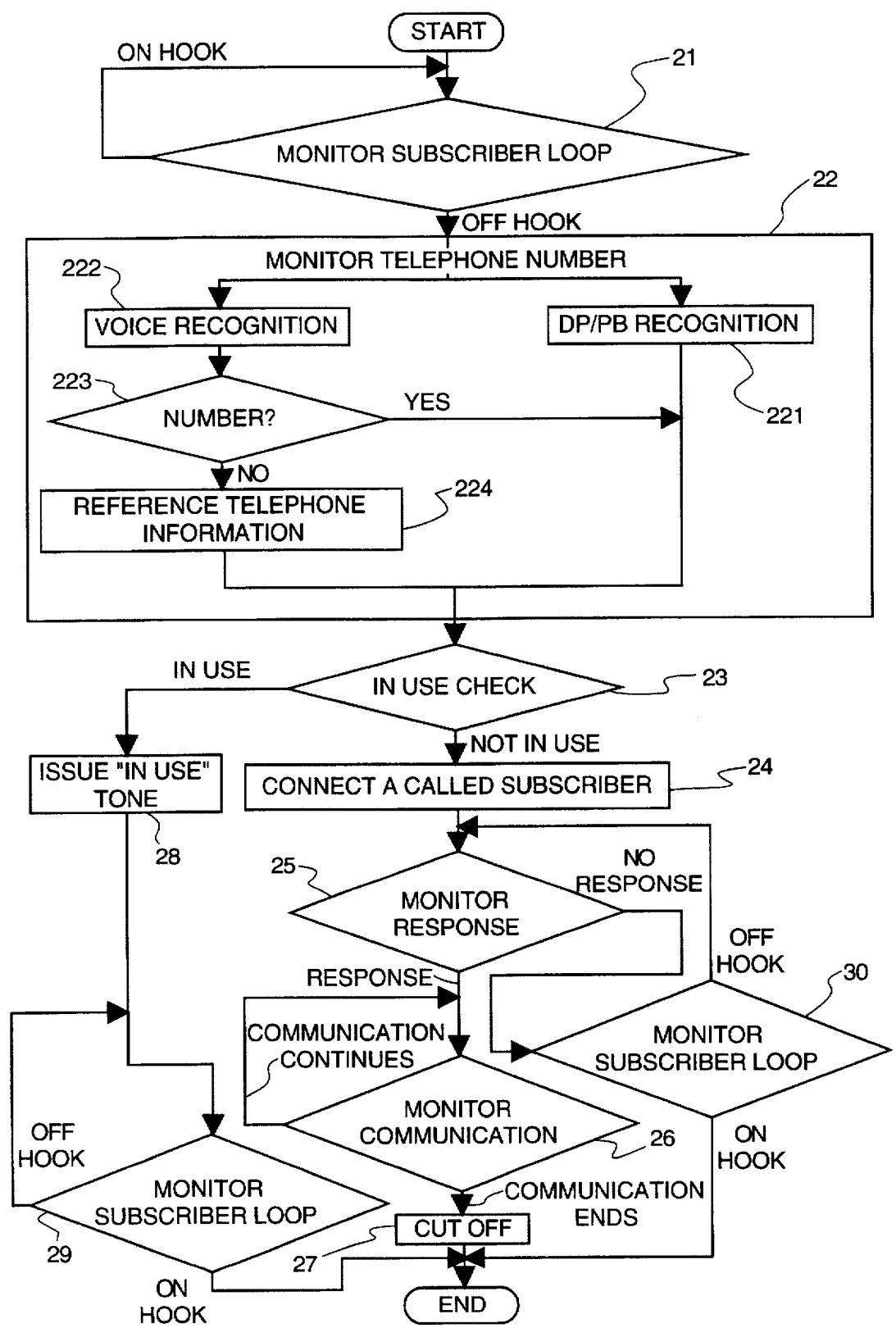
FIG. 6 is a flow chart of a circuit connection procedure performed by a telephone exchange.

FIG. 6 illustrates an exemplary flow chart showing the circuit switching procedure performed by a telephone exchange according to the invention. First, the telephone exchange is in a subscriber loop monitoring state (step 21). When a calling subscriber lifts the handset, the telephone exchange detects the off-hook state of the subscriber loop and enters a subscriber telephone number monitoring state (at 22). Then, when a PB signal or a DP signal is supplied, the PB signal recognition means 3331 or the DP signal recognition means 3332 detects the dialed number (step 221). When voiced information is entered, the processing will vary depending on whether the result of the speech recognition (step 222) is a number (step 223). If the speech recognition result is a number, such as "23-4567", the recognition result constitutes a dialed number. When the speech recognition result is not a number, the telephone directory information in the dialed number translating means 3335 is consulted to determine the dialed number corresponding to the recognition result (step 224).

Next, based on the dialed number thus obtained, the callee's subscriber loop 2 is located and a check is made to see if the circuit of the subscriber is in use (step 23). If the called subscriber loop 2 is not in use, it is connected to the caller's subscriber loop (step 24). The response of the called subscriber is monitored at step 25, and when the called subscriber responds to the call, communication begins. The communication is monitored until it ends (step 26).

According to the invention as described in this flow chart, when the telephone handset is off-hook, speech signals can immediately be accepted and sent out on the telephone circuit before the call route connection is established. Thus, the invention adds a speech recognition function to the conventional system that deals with speech as a dial initiation signal.

Although not illustrated, at the speech recognition stage (step 222), when the caller needs to be informed that the result of recognition is confirmed, that there are two or more called subscribers associated with the dialed number information, or that there is no called subscriber associated with the dialed number, the invention may include means for conveying such information to the caller (for example, a conventional speech output means or visual display).

Next, an example of using the hierarchical telephone exchange network including the telephone exchange of the invention will be described.

Figure 7:
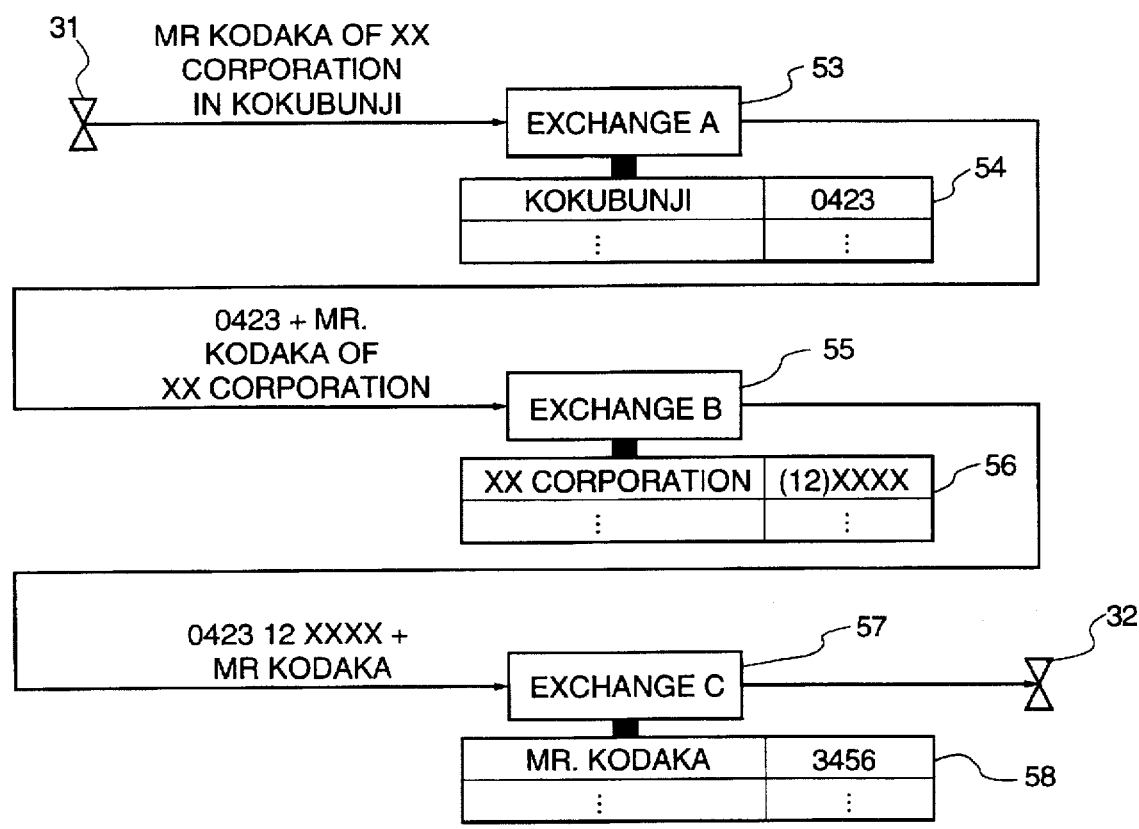
FIG. 7 shows an example of a telephone exchange network configuration comprising a plurality of telephone exchanges arranged in multiple stages.

FIG. 7 illustrates one example of a telephone network having multiple exchanges according to the invention, configured in multiple stages. For simplicity, the network illustrated in FIG. 7 comprises only three exchanges.

Suppose, for instance, a caller inputs the voice command to subscriber telephone 31, "Mr. Kodaka of XX Corporation in Kokubunji City." The exchange A 53 receives the spoken input from the caller and, by consulting the telephone directory information 54 stored in the exchange A 53, recognizes the voiced "Kokubunji" and converts it into the prefix "0423" corresponding to "Kokubunji". The exchange A 53 then connects to an exchange B 55 installed in a switching office in the 0423 region, and outputs "0423" (dialed number) and "Mr. Kodaka of XX Corporation" (voiced information). By using the telephone directory information 56, the exchange B 55 recognizes "XX Corporation" contained in the speech input received from the exchange A 53 and converts "XX Corporation" into "12-XXXX", wherein "XXXX" are four digits of the telephone number for the "XX Corporation". As a result, the exchange B 55 connects to an exchange C 57 installed at the XX Corporation, and outputs "0423-12-XXXX" (dialed number) and "Mr. Kodaka" (voiced information).

By using its telephone directory information 58, the exchange C 57 recognizes the speech input "Mr. Kodaka" and converts it into "3456", which represents the extension of Mr. Kodaka. Finally, the exchange C 57 is connected to the extension "3456", completing the telephone call to the number "0423-12-3456," where Mr. Kodaka will receive the call with subscriber telephone 32. In this example, the exchange C 57 is assumed to be a PBX.

Although preferred embodiments of the invention have been described above, the invention is not limited to the specifics of these embodiments. For example, speech recognition may be based upon syllables or entire words. Furthermore, telephone company records may be used, but there is no further requirement for special preregistration by a caller, as is required in the conventional systems.

Moreover, in the multiple-stage exchange embodiment described with regard to FIG. 7, the example illustrates a one-to-one correspondence between the voiced information and the tables in which the information is stored with its correspondence to relevant portions of a dialed number. However, in the event that there is no one-to-one correspondence between the voiced information and the number to be dialed (for example, if Mr. Kodaka worked for "Kokubunji Corporation" in Kokubunji), it is perceived that the information would be converted based upon order of entry, or that the caller would be prompted with a plurality of choices from which to select the desired party. However, other means for distinguishing input information and for converting the information to output signals are properly considered within the spirit and scope of the invention.

Various other modifications to the preferred embodiments will be evident to the person of ordinary skill in the art. All such modifications that basically rely upon the teachings through which the present invention has advanced the state of the art are properly considered within the spirit and scope of the invention.

We claim:

1. A telephone exchange network, comprising:

a plurality of telephone exchanges each including:

means for connecting a plurality of subscriber loops together via a plurality of trunks;

speech recognition means for recognizing speech information input via one of the subscriber loops, and for converting at least part of the recognized speech information into call routing information, wherein the speech recognition means recognizes numbers and words expressed in the speech information, and wherein the speech recognition means includes callee information translating means for referencing and generating the call routing information based upon the recognized numbers and words expressed in the speech information; and call route control means for routing a telephone call commanded by the call routing information output from the speech recognition means; and means for selectively controlling the speech recognition means of each of the telephone exchanges according to a defined procedure.

2. A telephone exchange network according to claim 1, wherein each of the telephone exchanges is accessible simply by inputting the speech information to the speech recognition means.

3. A telephone exchange network according to claim 1, wherein an output of one of the telephone exchanges is connected to an input of another of the telephone exchanges.

4. A telephone exchange network according to claim 1, further comprising:

means for inputting a push-button tone dial signal; and means for selecting one of the push-button tone dial signal and the speech information for conversion into the call routing information.

5. A telephone exchange network according to claim 1, wherein the means for selectively controlling the speech recognition means controls the speech recognition means of each of the telephone exchanges according to a defined procedure that includes initially recognizing only a part of the input speech information in a first one of the exchanges, and outputting call routing information converted from the recognized part to a second one of the exchanges along with the unrecognized part of the speech information;

wherein the means for selectively controlling the speech recognition means controls the speech recognition means of the second one of the exchanges according to a defined procedure that includes recognizing and converting another part of the speech information input thereto, and outputting the call routing information received from the first one of the exchanges and call routing information converted from the another part of the speech information recognized by the speech recognition means of the second one of the exchanges, to a third one of the exchanges; and wherein one of the exchanges other than the first and second exchanges ultimately recognizes and converts a part of the speech information input thereto and outputs call routing information that is completely converted from the speech information input to the first one of the exchanges.

* * * * *